United States Patent
Spurr

(10) Patent No.: US 6,745,641 B2
(45) Date of Patent: Jun. 8, 2004

(54) CABLE LINKAGE

(75) Inventor: Nigel Victor Spurr, West Midlands (GB)

(73) Assignee: Meritor Light Vehicle System (UK) Limited, Birmingham (GB)

(*) Notice: Subject to any disclaimer, the term of this patent is extended or adjusted under 35 U.S.C. 154(b) by 0 days.

(21) Appl. No.: 10/127,348

(22) Filed: Apr. 22, 2002

(65) Prior Publication Data

US 2002/0170375 A1 Nov. 21, 2002

(30) Foreign Application Priority Data

Apr. 28, 2001 (GB) .............................................. 0110457

(51) Int. Cl.$^7$ ................................................ F16C 1/10
(52) U.S. Cl. ...................................... 74/502.4; 74/502.6
(58) Field of Search .............................. 74/502.4, 502.6, 74/503

(56) References Cited

U.S. PATENT DOCUMENTS

| | | | |
|---|---|---|---|
| 4,459,834 A | * 7/1984 | Seki | 74/501.6 |
| 4,674,781 A | * 6/1987 | Reece et al. | 292/336.3 |
| 5,195,393 A | * 3/1993 | Wolfington et al. | 74/502.4 |
| 5,288,115 A | * 2/1994 | Inoue et al. | 292/201 |
| 5,732,988 A | * 3/1998 | Mizuki | 292/201 |
| 6,076,882 A | * 6/2000 | Szerdahelyi et al. | 296/146.1 |

FOREIGN PATENT DOCUMENTS

| | | | |
|---|---|---|---|
| DE | 3909854 A1 | * 9/1990 | F16C/1/16 |
| EP | 0 125 959 A1 | 11/1984 | |
| GB | 1 562 353 | 3/1980 | |
| GB | 2 038 439 A | 7/1980 | |
| GB | 1 574 930 | 9/1980 | |

OTHER PUBLICATIONS

Search Report under Section 17 dated Aug. 16, 2001.

* cited by examiner

*Primary Examiner*—David A. Bucci
*Assistant Examiner*—Bradley J. Van Pelt
(74) *Attorney, Agent, or Firm*—Carlson, Gaskey & Olds

(57) ABSTRACT

A cable linkage comprising a cable partially housed within a sheath and a fitting for securement to a linkage member, a length of cable between the fitting and the sheath being exposed when the cable is extended in use, wherein the fitting has a guide follower arranged to follow a guide so as to substantially inhibit kinking of the exposed length of cable.

3 Claims, 3 Drawing Sheets

CABLE LINKAGE

This application claims priority to British Application No. GB 0110457.9 filed Apr. 28, 2001.

BACKGROUND OF THE INVENTION

The present invention relates to a cable linkage. More particularly, the present invention relates to a cable linkage having a guide to inhibit the kinking of the cable when a compression load is applied thereto.

The use of cables to enable the remote actuation of devices such as latches and locks on vehicle doors, for example, is well known.

In order to simplify the design and installation of cables within doors, it is desirable that sheathed multi-strand flexible cable with a reduced internal friction is used so that the cable may be routed easily around obstacles within the door. Additionally, the use of flexible cables is desirable as slack can be provided along the cable run. This means that in the event of an impact which deforms the door, the deformation is unlikely to cause unwanted actuation due to a tightening of the cable, which would lead to the door becoming unlatched.

While flexible cables are effective when required to exert a tensile load, the reduced internal friction of flexible cables results in an intrinsic tendency to kink when called upon to exert a compression load and are unconstrained by an outer sheath, thus preventing actuation of devices connected thereto in this direction.

One solution that has been previously proposed in order to overcome this problem provides a rigid end piece to the cable that extends into the cable sheath so that none of the flexible cable is exposed. Thus, this arrangement substantially mitigates the tendency to kink. However, the installation and/or use of such an arrangement is not possible when the end of the cable proximate the device to be actuated has to be routed through a tight angle in order to avoid obstructions, for example, due to the inflexibility of this end of the cable. Furthermore, such an arrangement generally requires an enlarged end to the sheath to accommodate the rigid end piece, which may be undesirable when space is restricted.

SUMMARY OF THE INVENTION

The present invention seeks to overcome, or at least mitigate, the problems of the prior art.

An aspect of the present invention provides a cable linkage comprising a cable partially housed within a sheath and a fitting for securement to a linkage member, a length of cable between the fitting and the sheath being exposed when the cable is extended in use, wherein the fitting has a guide follower arranged to follow a guide means so as to substantially inhibit kinking of the exposed length of cable.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
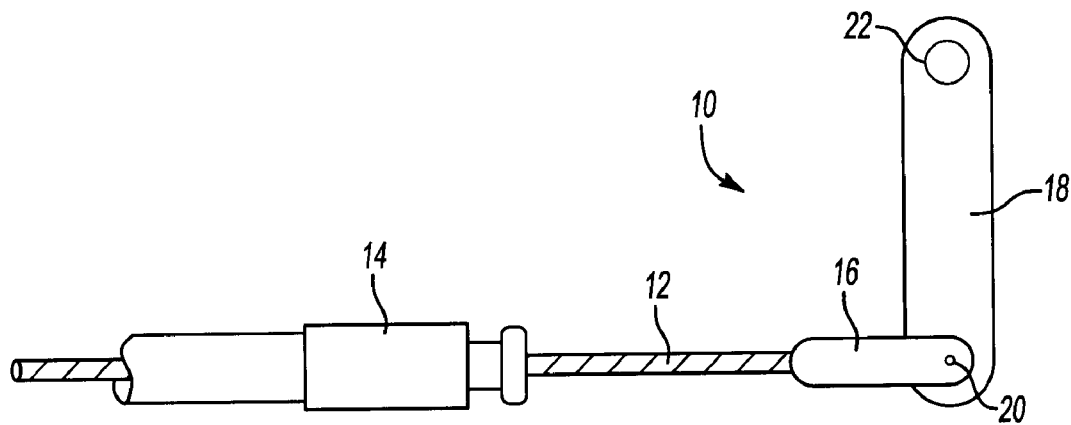
FIG. 1A is a side view of a prior art cable linkage.

Referring to FIG. 1, a prior art cable linkage 10 as illustrated comprises a flexible multi-stranded cable 12 housed along the majority of its length by a sheath 14 which permits relative axial movement of the cable 12. The cable terminates in an end fitting 16 connected to an arm 18 by a pivot pin 20 at one end of the arm 18. The arm 18 is further pivotally connected at its other end to an input shaft 22 of a door latch, for example.

In use, axial movement of the cable 12 relative to the sheath 14 induced by a remote actuator such as a door handle (not shown) is converted into rotational motion of the input shaft 22 which may in turn actuate the door latch.

Figure 1B:
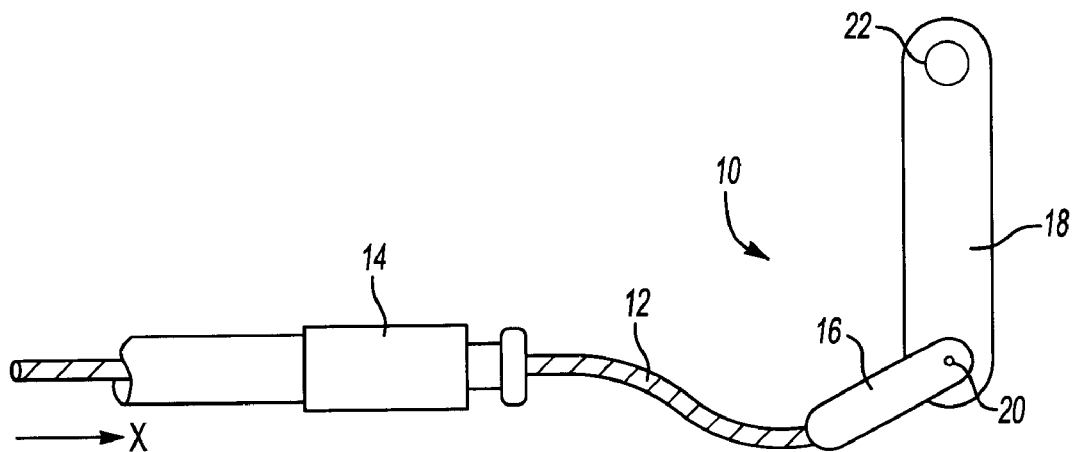
FIG. 1B is a side view of the linkage of FIG. 1A having a compression load exerted thereon.

It will, however, be apparent to those skilled in the art that if a compression load is applied to the cable 12 in a direction X and resistance is encountered in rotation of the input shaft 22, at a certain load, this resistance becomes sufficient to overcome the internal friction of the cable where it is unconstrained by the sheath. This causes the end fitting 16 to pivot about pivot pin 20 and kink as shown in FIG. 1B rather than causing the input shaft 22 to rotate. Clearly, such malfunctioning is unacceptable as it may prevent entry or exit from a vehicle, for example.

Figure 2:
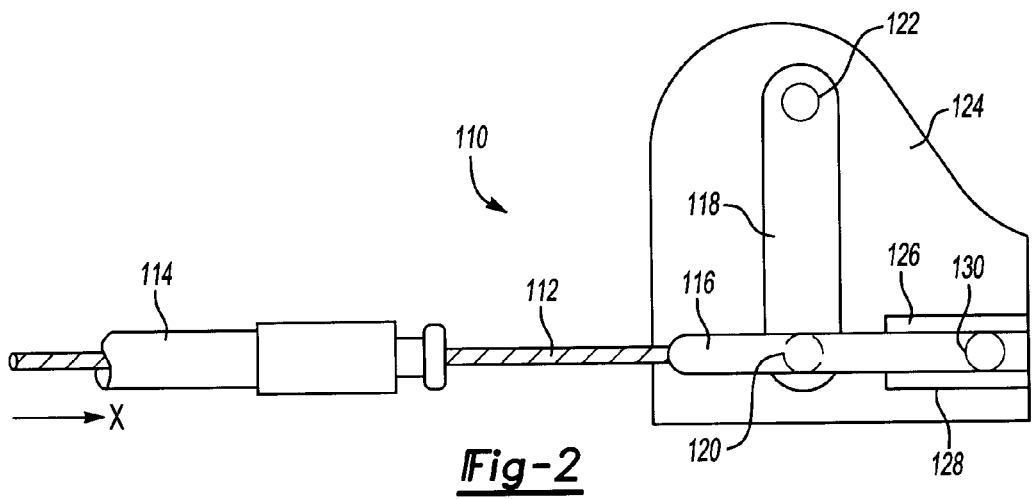
FIG. 2 is a side view of a cable linkage according to one version of the present invention.

Turning now to FIG. 2, like numerals have been used for like parts with the addition of the prefix '1'. Thus, only those differences with respect to FIGS. 1A and 1B are discussed in greater detail below.

It can be seen that in FIG. 2, the end fitting 116 has been extended beyond the pivot pin 120 connecting it to arm 118 (also known as a linkage member). The end fitting has a finger portion 130 (also known as a guide follower) protruding at substantially right angles from the fitting at the end thereof remote from the exposed cable 112. In this version, the arm 118 is pivotally secured to a plate 124 by shaft 122 and a guide in the form of a pair of mutually spaced parallel elongate projections 126 and 128 is provided thereon, either side of the finger 130, to act as a guide for the finger portion 130. In order to prevent the arm 118 fouling on the elongate projections 126, 128 as it pivots, it is preferable that sufficient clearance is provided between the plate 124 and the arm 118.

In use, when a compression load is applied to the exposed cable 112 in the direction X against the resistance in shaft 122, because the guide causes the end fitting 116 to remain substantially parallel to the longitudinal axis of the exposed cable 112 and as the end fitting 116 is non-rotatably secured to the exposed cable 112, this arrangement substantially impairs the tendency of the cable to kink. Thus, a flexible cable fitted to the linkage of FIG. 2 is able to transmit a substantially higher compression load by comparison with the prior art cable linkage 10 of FIGS. 1A and 1B.

Figure 3:
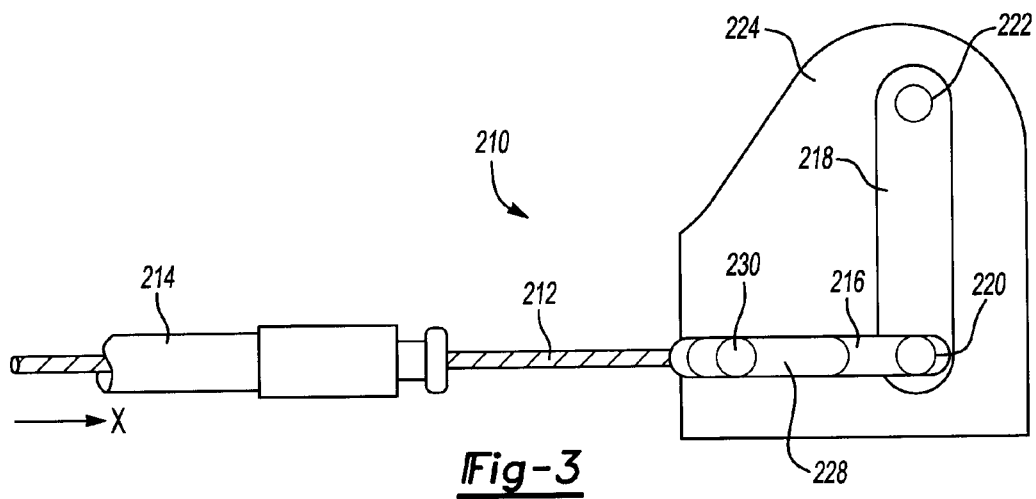
FIG. 3 is a side view of a cable linkage according to a second version of the present invention.
Figure 4:
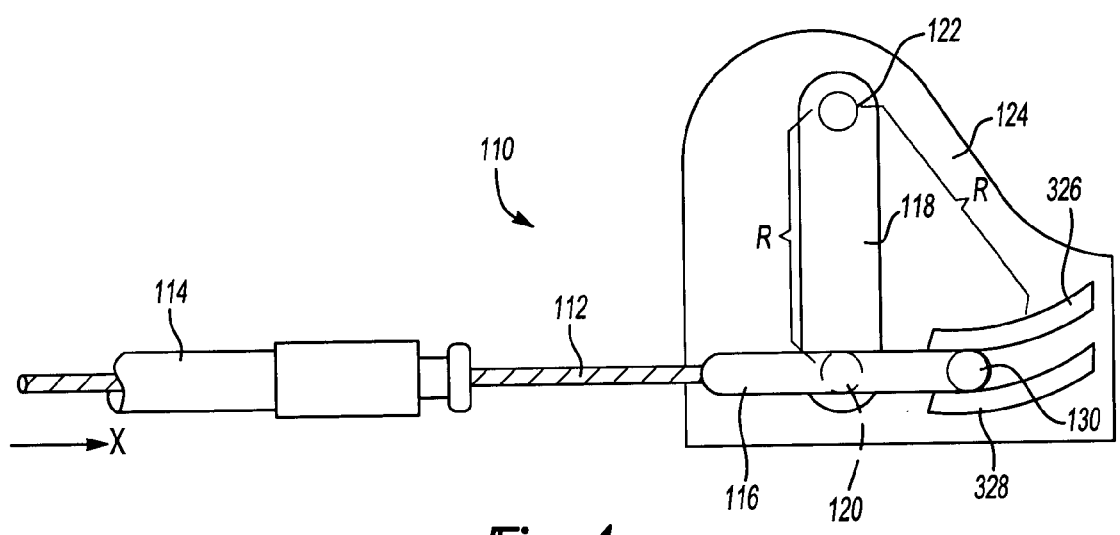
FIG. 4 shows curved elongate projections.

Turning now to FIG. 3, a second version of the invention is illustrated in which like numerals have been used for like parts with the addition of the prefix '2'. Again, only the differences of FIG. 3 in respect of FIG. 2 are discussed in further detail below.

It can be seen from FIG. 3 that in this version the spaced guide elongate projections 126 and 128 have been replaced by a slot 228 provided in the cable side of plate 224. Additionally, the finger 230 has been mounted at the other side of pin 220 on fitting 216 so as to be guided by the slot 228. It is apparent that this embodiments operates in a similar manner to the embodiment disclosed in FIG. 2 but this arrangement of guide means may be advantageous in certain instances due to space restrictions, for example.

It should be understood that numerous changes may be made within the scope of the invention. For example, in an embodiment that requires arm 218 to rotate through a relatively large angle, it may be advantageous for the slot or the elongate projections 126 and 128 to be curved so as to follow a similar arc to that described by pivot pin 120/220 in order that the longitudinal axis of the end fitting 216 remains parallel with the longitudinal axis of the cable 212. Of course, the invention may also be applied to other types of linkage that operate linearly. It should also be appreciated that the present invention has a wide variety of applications in the autolotive and other fields and is not limited to linkages for latching car doors, for example. In preferred embodiments, the cable is of the multi-strand type. However, it should be understood that the invention may also be applied to single strand cables to enable smaller diameter cables of this type to be used in transmitting an equivalent compression load than has hitherto been possible.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A cable linkage comprising:

a cable partially housed within a sheath;

a fitting for securement to a linkage member;

a length of cable between the fitting and the sheath, the length of cable exposed when the cable is extended in use;

wherein the fitting has a guide follower arranged to follow a guide and a structure for restricting pivoting of the fitting relative to guide so as to substantially inhibit kinking of the exposed length of cable;

wherein the follower comprises a finger; and wherein the guide comprises a pair of mutually spaced substantially elongate projections and the finger is disposed slidably therebetween.

2. A cable linkage comprising:

a cable partially housed within a sheath;

a fitting for securement to a linkage member;

a length of cable between the fitting and the sheath, the length of cable exposed when the cable is extended in use;

wherein the fitting has a guide follower arranged to follow a guide and a structure for restricting pivoting of the fitting relative to guide so as to substantially inhibit kinking of the exposed length of cable; and wherein the guide follower is located at the side of the point of securement of the fitting to the linkage member remote from the end of the sheath.

3. A cable linkage comprising:

a cable partially housed within a sheath;

a fitting for securement to a linkage member;

a length of cable between the fitting and the sheath, the length of cable exposed when the cable is extended in use;

wherein the fitting has a guide follower arranged to follow a guide and a structure for restricting pivoting of the fitting relative to guide so as to substantially inhibit kinking of the exposed length of cable; and wherein the structure comprises the fitting at a first location and the guide follower at a second location distinct from the first location.

* * * * *